(12) United States Patent
Decaux et al.

(10) Patent No.: US 12,209,959 B2
(45) Date of Patent: Jan. 28, 2025

(54) METHOD FOR ANALYSING A BIOLOGICAL SAMPLE WITH ARTEFACT MASKING

(71) Applicant: BIOMERIEUX, Marcy l'Etoile (FR)

(72) Inventors: Dominique Decaux, Chaponost (FR); Emilie Bisceglia, La Tour de Salvagny (FR); Guillaume Perrin, Tassin-la-demi-lune (FR); Philippine Barlas, La Buisse (FR); Emilie Collignon, Meximieux (FR)

(73) Assignee: BIOMERIEUX, Marcy l'Etoile (FR)

( * ) Notice: Subject to any disclaimer, the term of this patent is extended or adjusted under 35 U.S.C. 154(b) by 167 days.

(21) Appl. No.: 18/025,824

(22) PCT Filed: Sep. 23, 2021

(86) PCT No.: PCT/FR2021/051633
§ 371 (c)(1),
(2) Date: Mar. 10, 2023

(87) PCT Pub. No.: WO2022/064145
PCT Pub. Date: Mar. 31, 2022

(65) Prior Publication Data
US 2023/0288329 A1  Sep. 14, 2023

(30) Foreign Application Priority Data

Sep. 25, 2020 (FR) .................................. 2009775

(51) Int. Cl.
*G01N 21/45* (2006.01)
*G01N 15/1429* (2024.01)
(Continued)

(52) U.S. Cl.
CPC ....... *G01N 21/453* (2013.01); *G01N 15/1429* (2013.01); *G01N 15/1433* (2024.01); *G01N 2015/145* (2013.01)

(58) Field of Classification Search
CPC .. G01N 21/453; G01N 21/59; G01N 15/1429; G01N 15/1463; G01N 2015/145;
(Continued)

(56) References Cited

U.S. PATENT DOCUMENTS

| 5,566,249 A | 10/1996 | Rosenlof et al. |
| 2015/0124259 A1* | 5/2015 | An ..................... G01B 9/02091 356/456 |

(Continued)

FOREIGN PATENT DOCUMENTS

WO  2019/135060 A1  7/2019

OTHER PUBLICATIONS

Jan. 24, 2022 International Search Report issued in International Patent Application No. PCT/FR2021/051633.

*Primary Examiner* — Hoa Q Pham
(74) *Attorney, Agent, or Firm* — Oliff PLC

(57) ABSTRACT

A method for analysing a biological sample by means of an analysis instrument, the sample including biological agents and being arranged in an analysis receptacle in view of a holographic imaging system, the method including: acquiring a holographic image of the sample, the holographic image associating an intensity value with each pixel, determining, from the image acquired, an image mask which associates an active or inactive state with each pixel in accordance with the intensity values so that an inactive state is associated with pixels which correspond to artefacts caused by elements present in the field of view other than biological agents, determining a value of at least one biomass parameter which represents the quantitative spatial distribution of biological agents in the field of view, using only the pixels of the holographic image having an active state, and supplying the value of the biomass parameter from the analysis results.

11 Claims, 4 Drawing Sheets

(51) Int. Cl.
*G01N 15/1433* (2024.01)
*G01N 15/1434* (2024.01)

(58) Field of Classification Search
CPC ............ C12M 41/36; C12Q 1/02; C12Q 1/18; G03H 1/0005; G03H 2001/005; G01B 9/021; G01B 9/02043; G01B 9/02091; G01B 9/02047; G02B 21/367; G02B 21/0056; H04N 5/2256; H04N 5/357; H04N 5/265; G06T 7/0012; G06T 7/97; G06T 5/00; G06T 5/50
USPC .............................. 356/39–41, 457, 300–326
See application file for complete search history.

(56) References Cited

U.S. PATENT DOCUMENTS

| | | | |
|---|---|---|---|
| 2018/0052425 A1 | 2/2018 | Ozcan et al. | |
| 2023/0340558 A1* | 10/2023 | Decaux | G03H 1/0005 |
| 2024/0019365 A1* | 1/2024 | Decaux | G01N 21/453 |

\* cited by examiner

METHOD FOR ANALYSING A BIOLOGICAL SAMPLE WITH ARTEFACT MASKING

TECHNICAL FIELD

The present invention relates to the field of analyzing biological samples by imaging, and more particularly to the masking of artefacts that may be present in an image during the determination of a biomass parameter representative of the quantitative spatial distribution of biological agents in a biological sample for the purpose of analyzing said biological sample.

PRIOR ART

The analysis of biological samples by imaging makes use of an optical analysis instrument into which the biological samples to be analyzed are introduced. A biological sample consists of a suspension of biological agents. The biological agents are, for example, microorganisms (bacteria, yeasts, molds, etc.). The analysis of a biological agent in the biological sample may comprise the identification of said biological agent or the determination of a characteristic of this biological agent, such as the minimum inhibitory concentration which would be effective against said biological agent.

The biological sample, called an inoculum in its initial state, is arranged in a receptacle or well that is at least partially transparent, through which the analysis instrument can make measurements of optical properties of the biological sample. The well contains a nutrient medium, together with one or more reagents, such as an enzyme substrate or antibiotics, to enable the biological agents present in the biological sample to be analyzed by means of any interactions with the reagents. A plurality of wells are usually provided, so that each receives some of the inoculum, each of the wells being provided with different reagents or with the same reagent at different concentrations. Depending on the nature of the biological agents present in the inoculum, the agents react with certain reagents and not with others, or at certain concentrations and not at others. For example, in the context of an antibiogram for antibiotic susceptibility testing, the reagents consist of different antibiotics at different concentrations, and the biological agents will multiply in the wells containing the antibiotics to which they are not susceptible, or in which the antibiotic concentration is insufficient, whereas their development will be more or less impeded in wells containing the antibiotics to which they are susceptible at sufficient concentrations.

Thus these differences of interaction between the biological agents and the reagents are indicated by different changes in the biomass in the wells. The biomass, that is to say the quantity of biological material present in each well, directly affects the optical properties of the biological sample present in each well, because the biological agents themselves have different optical properties from the solution in which they are in suspension.

In particular, the transmittance of the biological sample is affected by the change in concentration of biological agents. This has led to the development of methods for analyzing biological samples based on the determination of the change over time, in an incubation phase, of the overall transmittance (or absorbance, which is equivalent) of a well filled with the biological sample, for the purpose of determining a measurement of turbidity of the sample, typically expressed in McFarland units (McF). This turbidity measurement is directly representative of the biomass of biological agents in the biological sample. For this purpose, an emitting diode illuminates the sample with a light beam of known intensity, and a point-contact photodiode placed on the opposite side of the sample from the emitting diode can be used to determine the luminous intensity received after the light beam has passed through the biological sample. However, such a measurement of transmittance has a rather low sensitivity, making it impossible to measure a turbidity below 0.05 McF, or even below 0.1 McF. Furthermore, the biomass cannot always be used for determining the concentration of biological agents: if the volume of the biological agents increases, due to elongation, for example, in the case of bacteria, the biomass increases while the number of biological agents remains the same.

Consequently, it is an overall measurement that does not take into account the spatial distribution of the biological agents in the analysis receptacle, or any artefacts that may affect the measurements made. Such artefacts may have various sources. For example, the presence of air bubbles in the analysis receptacle, or creases in the film sealing the analysis receptacle, may considerably alter the propagation of the light waves, and therefore alter the optical measurements. Artefacts may also be caused by foreign bodies in the biological sample, that is to say bodies other than the biological agents and the saline solution, and present in the analysis receptacle, such as external dust, crystals of nutrients used for bacterial growth, reagents not dissolved in the saline solution, or the like. These foreign bodies may absorb some of the light rays, and therefore may also alter the transmittance measurements.

The U.S. Pat. No. 5,566,249 proposes a method for detecting bubbles in an image acquired by a microscope. A grayscale image is binomially filtered, and the grayscale image is then subtracted from the filtered image. Outline detection is implemented to detect the outlines of the air bubbles, the system filling the outlines detected in this way in order to map the presence of the bubbles. However, this system is not suitable for holographic images, but only for images acquired by a microscope, in which the bubbles appear as outlines. Moreover, this method cannot be used to highlight artefacts other than air bubbles.

DESCRIPTION OF THE INVENTION

The aim of the invention is therefore to make it possible, in the analysis of a biological sample, to determine a value of a biomass parameter of the biological agents present in the biological sample, without any alteration of the measurement due to possible artefacts caused by the presence of foreign bodies such as air bubbles.

To this end, the invention proposes a method for analyzing a biological sample by means of an analysis instrument, the biological sample comprising biological agents and being arranged in an analysis receptacle in a field of view of a holographic imaging system, the method comprising:
  acquiring a holographic image of the biological sample at an instant of measurement, the holographic image associating an intensity value with each pixel of said holographic image, the intensity values lying within a range of intensities extending between a minimum intensity value and a maximum intensity value,
  determining, from the holographic image acquired, an image mask which associates an active or inactive state with each pixel of the holographic image in accordance with the intensity values of the pixels of the holographic image, so that an inactive state is associated with pixels of the holographic image which correspond to artefacts caused by elements present in the field of view other than biological agents, the image mask being determined so that the inactive state is associated with at least some pixels of a connected set of pixels having intensity values within a masking range forming a subset of the intensity range, said masking range being delimited by at least one masking threshold, the determination of the image mask comprising the comparison of intensity values of the pixels of the holographic image with the at least one masking threshold and the association with each pixel of a first mask value indicating the inactive state of said pixel or a second mask value indicating the active state of said pixel in accordance with the result of the comparison, determining a value of at least one biomass parameter representative of the quantitative spatial distribution of biological agents in the field of view, on the basis of only those pixels of the holographic image that exhibit an active state defined by the image mask, supplying said value of the biomass parameter among the results of the analysis.

Because of the image mask, the pixels of the holographic image corresponding to artefacts caused by elements present in the field of view other than biological agents are not taken into account in the subsequent analysis of the holographic image, as a result of which the quality of this analysis is substantially improved and the analysis is made more robust to foreign bodies such as air bubbles in the analysis receptacle.

The invention is advantageously complemented by the various characteristics listed below, considered individually or in their various possible combinations:

the intensity values lie within a range of intensities extending between a minimum intensity value and a maximum intensity value, and a lower masking threshold corresponds to a value of between 5% and 25% of the extent of the intensity range, and preferably between 10% and 20% of the extent of the intensity range;

the intensity values lie within a range of intensities extending between a minimum intensity value and a maximum intensity value, and an upper masking threshold corresponds to a value of between 75% and 95% of the extent of the intensity range, and preferably between 80% and 90% of the extent of the intensity range;

the state of a pixel of the mask is determined by the intensity value of said pixel relative to at least one masking threshold;

the determination of the image mask takes into account criteria of the size or shape of connected sets of pixels having intensity values in the masking range, for the purpose of assigning an active or inactive state to the pixels of said sets of pixels, and/or takes into account criteria of size or shape of connected sets of pixels having similar active or inactive states, for the purpose of modifying an active or inactive state for the pixels of said sets of pixels;

the determination of the image mask comprises the implementation of mathematical morphology; in particular, morphological dilation is applied to the image mask, followed by morphological erosion;

the determination of the image mask comprises the use of a neural network preconfigured for associating an inactive state with pixels of the holographic image corresponding to artefacts caused by elements present in the field of view other than biological agents;

the value of the biomass parameter is derived from a number of biological agents appearing in the active pixels of the holographic image;

the determination of the value of the biomass parameter comprises the determination, for each of a plurality of areas of active pixels of the holographic image, of the presence or absence of biological agents in said area of active pixels;

the presence or absence of biological agents in an area of active pixels is determined by comparing a gray level value of the area with a threshold, or by comparing a pattern of the area with reference patterns in a database;

the image mask associates an active state with at least 25% of the pixels of the holographic image, and preferably with at least 35% of the pixels of the holographic image.

The invention also relates to an analysis instrument comprising a holographic system, with a field of view configured for acquiring a holographic image, and data processing means, the analysis instrument being configured for receiving a biological sample in an analysis receptacle in the field of view of the holographic system and for implementing the steps of the method of analysis according to the invention.

DESCRIPTION OF THE FIGURES

Other characteristics, objects and advantages of the invention will be apparent from the following description, which is purely illustrative and non-limiting and which is to be read with reference to the attached drawings, in which:

FIG. 8 shows a detail of FIG. 7, illustrating a set of active pixels in which the biological agents are searched for.

DETAILED DESCRIPTION

The method for analyzing a biological sample is implemented by means of an analysis instrument comprising a holographic imaging system with a field of view, the analysis instrument being configured for receiving a biological sample in an analysis receptacle in the field of view of the holographic imaging system.

Figure 1:
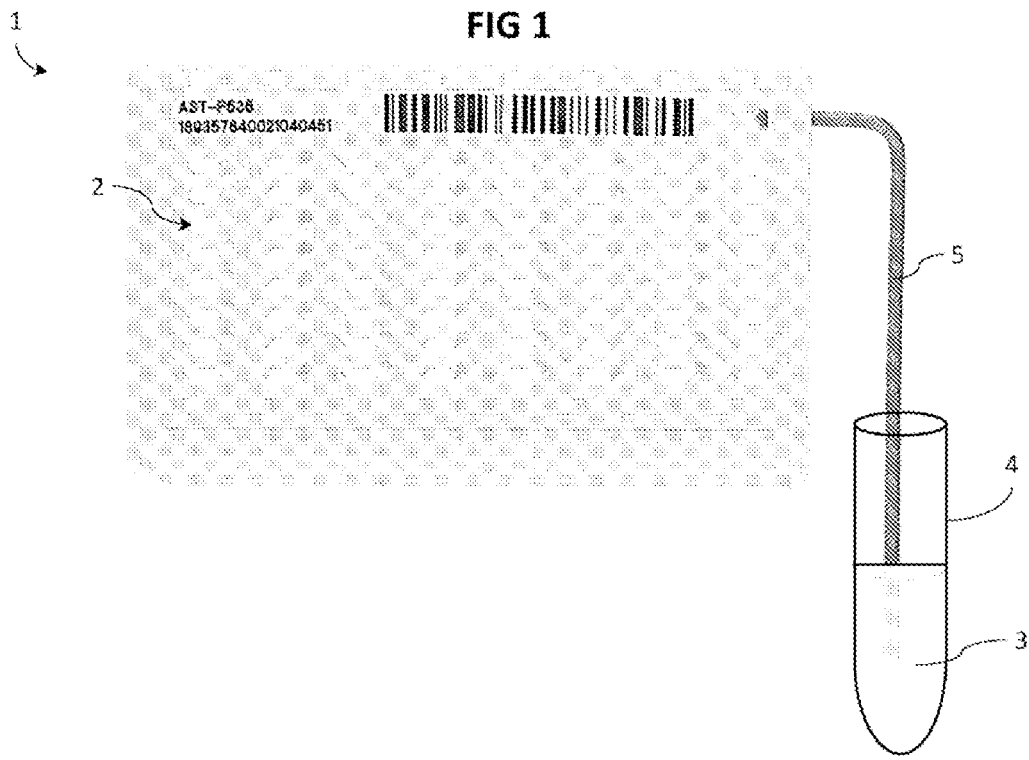
FIG. 1 shows an example of an analysis card comprising a plurality of receptacles in the form of wells that can be used for placing a biological sample for analysis, according to a possible embodiment of the invention.

FIG. 1 shows an example of an analysis card 1 comprising a plurality of analysis receptacles 2 in the form of wells that can be used for placing a biological sample for analysis. Here, the analysis receptacles 2 are organized in a two-dimensional grid on a plane, each receptacle 2 being associated with different analysis conditions, typically using different reagents present in the analysis receptacles 2. For example, in the context of an antibiogram for antibiotic susceptibility testing, the reagents consist of different antibiotics at different concentrations. The use of an analysis card 1 is not essential, but such an analysis card 1 makes it possible to conduct a plurality of tests in a standardized manner in the same period of analysis.

Each analysis receptacle 2 is at least partially transparent to at least one wavelength of light, visible or otherwise, and is preferably at least partially transparent for the visible spectrum. This transparency enables the biological sample contained in the receptacle to be analyzed by optical means such as the holographic imaging system. Preferably, an analysis receptacle 2 has at least two opposed transparent faces, so as to provide a transparent axis for the propagation of the light. These two opposed transparent faces are, for example, less than 10 mm apart, or preferably less than 5 mm apart. Typically, the opposed transparent faces are transparent films delimiting the analysis receptacle 2. The reagents are commonly fixed to at least one of the transparent faces. The reagents can thus be introduced into the analysis receptacle 2 by arranging them on the film which is to form a transparent face, before the film is applied to the analysis card 1.

For filling the analysis receptacles 2, such an analysis card 1 may, for example, comprise a conduit 5 to be immersed in a quantity 3 of inoculum 3 prepared in a tube 4. The inoculum is prepared by an operator, who introduces biological agents, for example agents taken from a culture in a Petri dish with a rod or swab, in suspension in a saline solution, with a dilution corresponding to a specified turbidity range, for example between 0.5 and 0.63 McF for biological agents in the form of bacteria, or alternatively between 1.8 and 2.2 McF for biological agents in the form of yeasts, the range depending on the type of analysis conducted and the measuring instrument. This preliminary suspension is then diluted further, for example by a factor of 20 or up to 100 for analyzing Gram-bacteria, or by a factor of 10 or up to 100 for analyzing Gram+ bacteria. This further dilution may, notably, be automated, and may therefore be carried out by the measuring instrument after the tube 4 has been placed in the analysis instrument. Evidently, other specified ranges of turbidity may be used, depending on the protocols used. The desired dilution may be obtained in one procedure, or in more than one procedure, as in the above example.

One end of the conduit 5 is then immersed in the quantity of inoculum 3 resulting from the preparation in the tube 4, and the whole is introduced into the analysis instrument. Evidently, any or all of these preparatory steps may be automated. The inoculum travels through the conduit 5 and is then distributed, via a fluid flow circuit formed in the analysis card 1, among the analysis receptacles 5. This movement of the inoculum in the conduit 5 and the analysis card 1 may be produced by capillary action and/or by a reduction in the pressure of the air present at the open end of the tube 4. For example, in the case of pressure reduction, the air present in the analysis card 1, which is at atmospheric pressure, passes out of the analysis card 1 via the tube 5 through the inoculum 3, vacating a space for the inoculum 3, which thus rises through the tube 5 into the analysis card 1. Conversely, it is possible to apply air pressure to the inoculum via the open end of the tube 4 in order to cause the inoculum 3 to rise up the tube 5. The biological sample consisting of the inoculum is then placed in an analysis receptacle 2.

Figure 2:
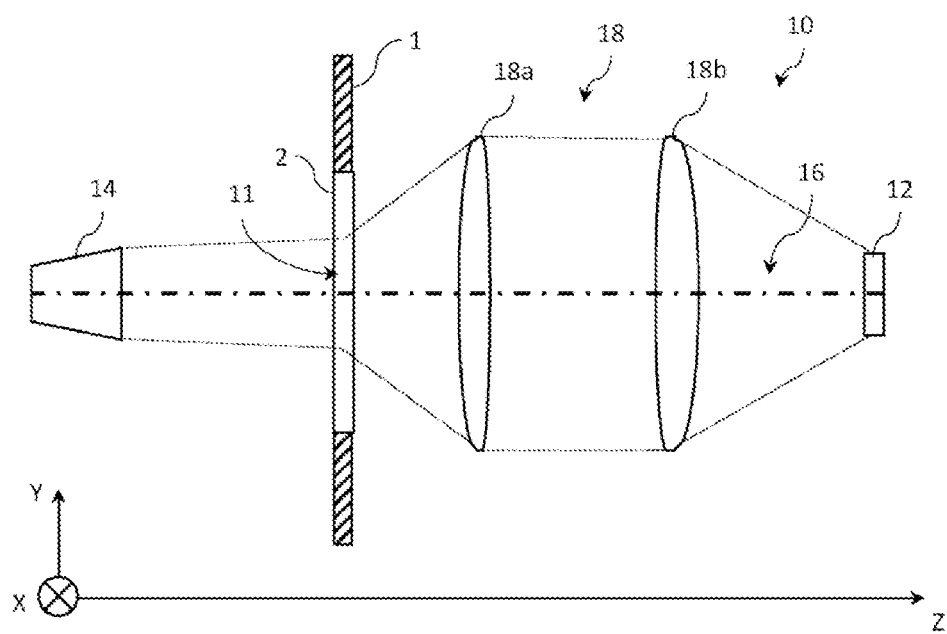
FIG. 2 shows schematically an example of a holographic imaging system that can be used in an analysis instrument according to a possible embodiment of the invention.

The analysis instrument comprises a holographic imaging system with a field of view, configured for acquiring a holographic image of this field of view. The acquisition of a holographic image provides a large depth of field, and consequently very high sensitivity for detecting biological agents. For the acquisition of a holographic image, the holographic imaging system is positioned facing an analysis receptacle 2. By way of non-limiting example, FIG. 2 shows schematically an in-line holographic imaging system 10 arranged so that the field of view 11 of said holographic imaging system 10 is contained within the volume of biological sample contained in an analysis receptacle 2. The analysis card 1, and therefore the analysis receptacles 2 that it comprises, is placed in an object plane of the holographic imaging system 10. The holographic imaging system 10 defines an imaging axis 16, which is simplified here as a straight line corresponding to the optical axis, but which may consist of a set of successive straight lines defining the light path, depending on the configuration of the optical components of the holographic imaging system 10.

On one side of the analysis receptacle 2, on the optical axis 16 in this case, there is a light source 14 configured for illuminating the analysis receptacle 2 in the field of view of the holographic imaging system 10 by means of an illuminating beam of sufficiently coherent light. The light source 14 may produce the illuminating light, or may simply be the termination of an optical fiber guiding this illuminating light, possibly provided with a diaphragm or iris. The illuminating beam has the conventional characteristics for holographic imaging, without any particular additional constraints. The illuminating beam may thus be monochromatic (with a wavelength of about 640-670 nm, for example) or may possibly be composed of a plurality of wavelengths, used one after another for example.

On the other side of the analysis receptacle 2, on the optical axis 16 in this case, there is an image sensor 12, which is a digital sensor such as a CMOS or CCD sensor. The image sensor 12 is placed on an image plane of the holographic imaging system 10, and is configured for acquiring a hologram, that is to say a spatial distribution of intensity of the interference caused by interactions between the inoculum placed in the field of view 11 and the illuminating beam.

The holographic imaging system 10 is here provided with a set of optical members 18 arranged between the analysis receptacle 2 and the digital image sensor 12, for example a microscope objective 18a and a tube lens 18b in the illustrated example. However, an optical member such as the microscope objective 18 is optional, since the invention is not limited to lens-based holographic microscopy. Evidently, the arrangement described here is a non-limiting example Any holographic imaging system 10 may be used, with different optical members (with or without a microscope objective, etc.). Thus, provided that a holographic imaging system 10 can acquire an image in which interference patterns generated by the biological sample appear, this holographic imaging system is suitable for the implementation of the method. Preferably, however, the holographic imaging system 10 is configured for defining a depth of field of at least 100 µm in the direction of the optical axis 16 around each focal plane of acquisition 20, and preferably a depth of at least 150 µm, and even more preferably a depth of at least 250 µm. Typically, the analysis receptacle 2 comprises two opposed transparent faces arranged along the optical axis 16, and the depth of field extends for at least 100 µm between the two opposed transparent faces of the analysis receptacle, and preferably for at least 150 µm, and even more preferably for at least 250 µm. The field of view 11 extends in the form of a space in which the presence of biological agents may be determined on the basis of a hologram that images said field of view 11.

The measuring instrument also comprises components for processing the data, such as a processor, a memory, communication buses, etc. Since these other components are not specific except as regards the method that they implement and the instructions that they contain, they will not be detailed further.

Figure 3:
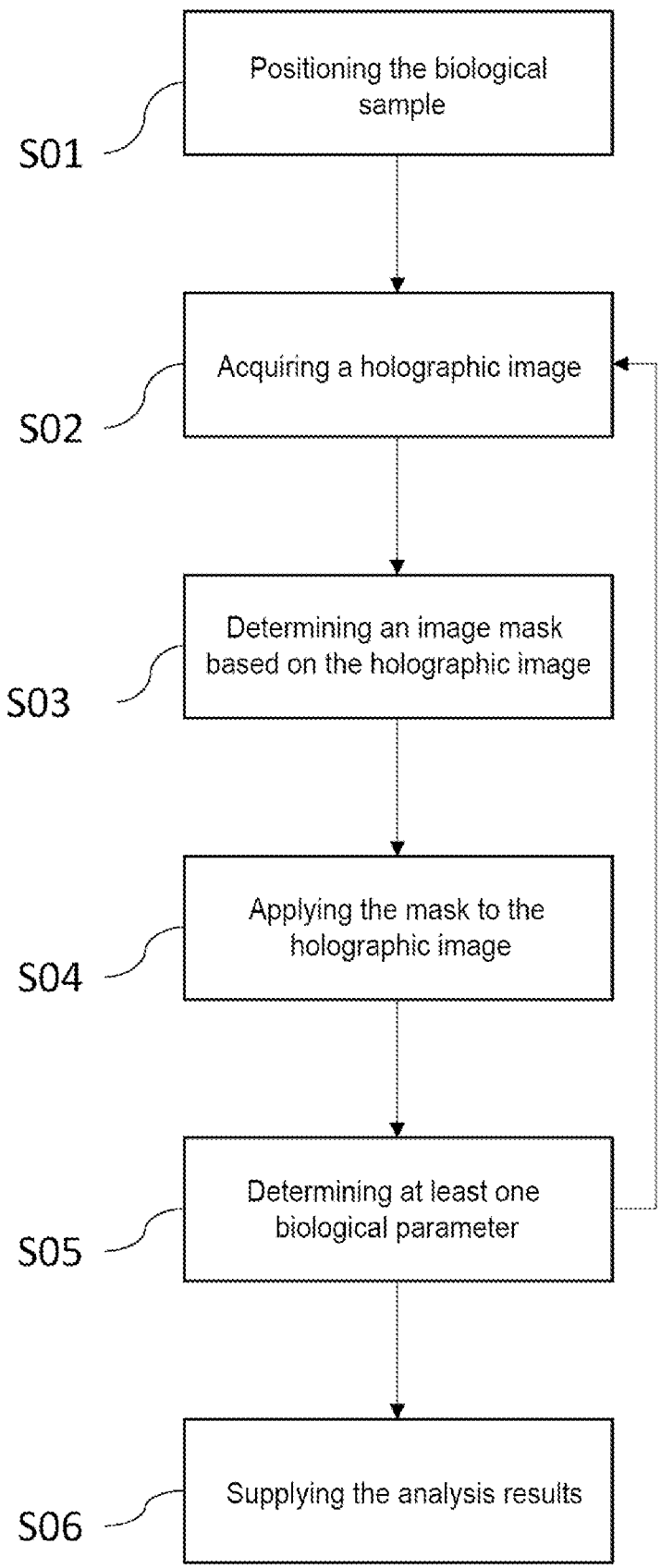
FIG. 3 is a diagram illustrating steps of the method of analysis according to a possible embodiment of the invention.

FIG. 3 is a diagram illustrating steps of the method of analysis, which follow the preliminary placing (step S1) of the biological sample in an analysis receptacle 2 in the field of view 11 of the holographic imaging system 10, detailed above.

Each measurement cycle comprises the acquisition (step S02) of a holographic image of the biological sample at an instant of measurement.

For the acquisition of a holographic image, the holographic imaging system acquires a hologram, which has the advantage of providing a large depth of field, and consequently very high sensitivity for detecting biological agents in the biological sample. For the acquisition of a hologram, the light source 14 emits a reference illuminating beam, which may be indicated by a flat reference wave propagating in the direction Z along the imaging axis 16. The biological agents present in the field of view 11 in the analysis receptacle 2 diffuse the incident reference light because of their diffraction properties. The wave diffused by the biological agents and the reference wave interfere on the image sensor 12 to form the hologram. Since an image sensor 12 is sensitive only to the electromagnetic field intensity, the hologram corresponds to the spatial distribution of intensity of the total field corresponding to the addition of the diffused wave and the reference wave, which is indicated by a gray level value for each pixel. The holographic image that is used may be the hologram or may be an image reconstructed by back propagation calculation based on the hologram, using a propagation algorithm, based on the Rayleigh Sommerfeld diffraction theory, for example. In the same way as the hologram, such a reconstructed image is defined by gray levels for each pixel. By using the hologram without reconstruction, it is possible to benefit from high detection sensitivity, because each biological agent appears in the hologram surrounded by rings corresponding to the interference patterns caused by the presence of said biological agents, thereby facilitating the detection of the presence of these biological agents. Furthermore, the omission of reconstruction yields savings in terms of time and calculation resources. However, the use of a reconstructed image has other advantages, such as the ability to locate precisely, possibly in three dimensions, the biological agents appearing in the reconstructed image.

In all cases, the holographic image associates an intensity value with each pixel of said holographic image. These intensity values lie within a range of intensities extending between a minimum intensity value and a maximum intensity value. The intensity value is typically a gray level value. If the gray level is encoded on 8 bits, the intensity values may be whole numbers in the range between the minimum intensity value 0, corresponding to black, and the maximum intensity value 255, corresponding to white. Evidently, other encodings of the intensity values may be used.

Figure 4:
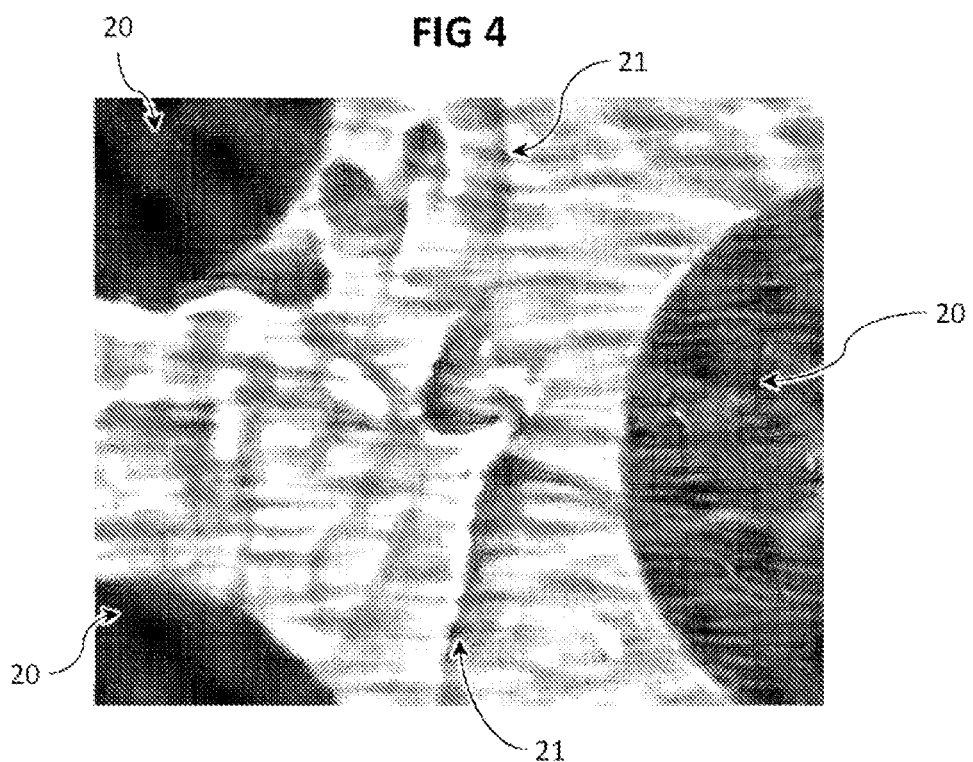
FIG. 4 is an example of a holographic image in which bubbles present in the analysis receptacle appear.

FIG. 4 shows an example of a holographic image thus acquired, in this case an image reconstructed from a hologram. This is a 2400×2500 pixel image covering a field of view 11 extending over approximately 1.5 mm$^2$ with a depth of field of around 200 μm. The gray levels are encoded on 8 bits (256 gray levels), 0 being black and 255 being white.

The biological sample here consists of a saline solution of *Pseudomonas aeruginosa* as the biological agents. Artefacts appear on this image of a biological sample, covering a significant part of the field of view 11. Firstly, air bubbles 20, appearing in black on the image, are distinguished. Because of the difference between the refractive index of the air inside the bubble and the refractive index of the saline solution, and because of the rounded shape of the interface between the air and the water forming the wall of the bubble, some of the incident light rays are reflected, and other rays are diffused, so that only the incident light rays in the center of the bubble, parallel to the optical axis 16, can pass through the bubble and reach the image sensor 12. Consequently, in the absence of any luminous intensity, the air bubbles 20 essentially appear as black shapes, but with a few luminous traces. Also distinguishable in the image are dark traces 21 caused by the non-flatness of the transparent films that seal the analysis receptacle 2 to form the two opposed transparent faces. For example, there may be relief elements such as folds. Artefacts such as the air bubbles 20 or these dark traces 21 appear in the holographic image even though they are not the biological agents to be imaged. These artefacts must therefore be eliminated in order to perform a correct analysis of the biological sample by means of the holographic image.

To this end, after the holographic image has been acquired, an image mask is determined (step S03) on the basis of the holographic image. The image mask associates an active or inactive state with each pixel of the holographic image. The image mask therefore comprises the same number of pixels as the holographic image. The active or inactive state of a pixel of the holographic image is determined on the basis of the intensity values of the pixels of the holographic image. The image mask is determined so that an inactive state is associated with pixels of the holographic image corresponding to artefacts caused by elements present in the field of view other than biological agents.

Since the artefacts in the holographic image often take the form of connected sets of pixels having intensity values within a masking range that forms a subset of the intensity range, the inactive state is associated at least with pixels of a set of adjacent pixels having intensity values within this masking range. This masking range is delimited by at least one masking threshold, and preferably by masking thresholds, namely a lower masking threshold and an upper masking threshold, higher than the lower masking threshold.

For example, the lower masking threshold corresponds to a value of between 5% and 25% of the extent of the intensity range, and preferably between 10% and 20% of the extent of the intensity range. The intensity range extends between the minimum intensity value and the maximum intensity value. Returning to the example of gray levels encoded on 8 bits (and therefore on a range from 0 to 255), the lower masking threshold is, for example, between 13 and 64, and preferably between 25 and 50. For example, the lower masking threshold corresponds to a value of between 75% and 95% of the extent of the intensity range, and preferably between 80% and 90% of the extent of the intensity range. Returning to the example of gray levels encoded on 8 bits (and therefore on a range from 0 to 255), the upper masking threshold is, for example, between 191 and 243, and preferably between 204 and 230. Preferably, the lower masking threshold and the upper masking threshold are separated by at least 60% of the extent of the intensity range, preferably by at least 70%, and preferably by at least 80% of the extent of the intensity range.

The determination of the image mask may, for example, comprise a succession of nonlinear operations such as thresholding or the application of a mathematical morphology. Thus the state of a pixel of the mask may be determined by the intensity value of said pixel relative to at least one masking threshold. For example, in the generation of the image mask, depending on the result of the comparison between each intensity value of each pixel of the holographic image and at least one masking threshold, either a first mask value, indicating the inactive state of a pixel, is associated with said pixel, or a second mask value, indicating the active state of said pixel, is associated with said pixel. The image mask associates the inactive state with the pixels having intensity values in the masking range that are typically near at least one end of the intensity range, the proximity to one end of the intensity range being defined by the masking threshold. Thus, if the intensity value of a pixel is below the lower masking threshold, an inactive state is associated with said pixel. Similarly, if the intensity value of a pixel is above the upper masking threshold, an inactive state is associated with said pixel. Conversely, an active state is associated with a pixel whose intensity value is outside the masking range, that is to say between the lower masking threshold and the upper masking threshold, or simply above the lower masking threshold if this is the only one used, or simply below the upper masking threshold if this is the only one used for defining the masking range.

Figure 5:
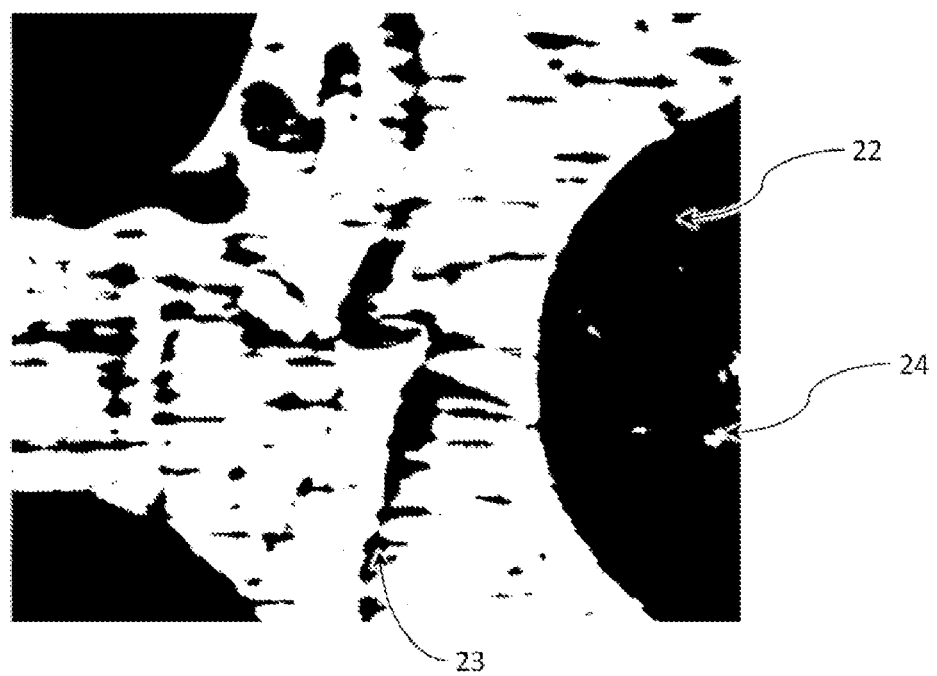
FIG. 5 is an example of an image mask determined on the basis of the holographic image of FIG. 4.

The image mask that associates either an active state or an inactive state with each pixel may therefore be interpreted as defining a binary image. FIG. 5 shows an example of a graphic representation of the image mask determined on the basis of the holographic image of FIG. 4, in which the pixels in the inactive state are represented in black and the pixels in the inactive state are represented in white. In this example, the image mask has been generated by using only one lower masking threshold at 40, that is to say at around 15.7% of the extent 0-255 of the gray level values. The pixels having gray level values equal to 40 or less have been associated with an inactive state, in black in the image of the image mask, and the pixels having gray level values of more than 40 have been associated with an active state, in white in the image of the image mask.

The rounded shapes 22 of the air bubbles can be found in black on the image mask, together with black traces 23 corresponding to the dark traces 21 of the holographic image of FIG. 4. However, it is also possible to see white traces 24 inside the rounded shapes 22 of the air bubbles, which may have been caused by irregularities in the optical path of the light rays, caused by creases for example, or corresponding to the rays that may have been able to pass through the air bubble. Additionally, the black traces 23 may exhibit discontinuities due to the fact that some pixels affected by the dark traces 21 are not taken into account in the image mask, which is an inevitable result of the use of a masking threshold.

The determination of the image mask may comprise the implementation of mathematical morphology, particularly after comparison with at least one masking threshold as described below. The aim of the mathematical morphology operations may, notably, be to modify the shapes of the connected sets of pixels locally, in order to regularize them. For example, in order to improve the continuity of the artefacts in the image mask, morphological dilation is preferably applied to the image mask, followed by morphological erosion, that is to say the application of morphological closing. The size of the structuring element used in these morphological operations depends on the level of morphological closing that is desired, and also on the characteristics of the image mask. For example, a low masking threshold with a high value will require a lesser degree of morphological closing operation than one with a low value.

Figure 6:
FIG. 6 shows the result of the application of morphological dilation followed by morphological erosion applied to the image mask of FIG. 5.

FIG. 6 shows the image mask resulting from the application of morphological dilation followed by morphological erosion, with a structuring element represented by a size window. It can be seen white traces 24 inside the rounded shapes 22 of the air bubbles. This is because the morphological closing causes the small white traces, which are isolated in a black shape, to be filled with black. Additionally, the black traces 23 are somewhat more regular.

The determination of the image mask may take into account criteria of the size or shape of connected sets of pixels having intensity values in the masking range, for the purpose of assigning an active or inactive state to the pixels of said sets of pixels, and/or takes into account criteria of size or shape of connected sets of pixels having similar active or inactive states, for the purpose of modifying an active or inactive state for the pixels of said sets of pixels. For example, in addition to the comparison with a masking threshold and/or the application of a mathematical morphology, it is possible to specify, for the association of a pixel with the inactive state, that the pixel should form part of a connected set of pixels having intensity values in the masking range, which represents a certain surface area. For example, artefacts such as those of the air bubbles 20 are represented by extended and connected shapes, which are also of regular rounded shape. By specifying a minimum size for the connected sets of pixels to be changed to the inactive state or a criterion of regularity of shape, the inactive state may, for example, be selectively restricted to the pixels of the air bubbles 20.

For the purpose of determining the image mask, it is also possible to use a neural network preconfigured for associating an inactive state with pixels of the holographic image corresponding to artefacts caused by elements present in the field of view other than biological agents. More precisely, the neural network is pre-trained on a learning database formed of pairs of holographic images and corresponding image masks, the image masks being, for example, determined as explained above, or in another way, so that an inactive state is associated with pixels of the holographic image corresponding to artefacts caused by elements present in the field of view other than biological agents. Then, in use, the neural network receives at its input the holographic image for which the image mask is to be determined, and supplies at its output the corresponding image mask, which associates an inactive state with pixels of the holographic image corresponding to artefacts caused by elements present in the field of view other than biological agents. As mentioned above, the artefacts in the holographic image often take the form of connected sets of pixels having intensity values within the masking range. Therefore the inactive state is also associated at least with pixels of a connected set of pixels having intensity values within a masking range.

When the image mask has been obtained, the image mask is applied (step S04) to the holographic image. The mask is applied so that the active and inactive states of the pixels of the image mask are used for restricting the subsequent processing executed on the holographic image: only the pixels of the holographic image corresponding to an active state in the image mask are then used, resulting in the designations of active and inactive for the states of a pixel. For example, the pixels of the holographic image corresponding to an inactive state in the image mask may be removed from the holographic image: the coordinates of these removed pixels are then not attributed. Other ways of applying the image mask may be envisaged, provided that the result of such application is that the pixels of the holographic image corresponding to an inactive state in the image mask are not taken into account.

The method then comprises the determination (step S05) of a value of at least one biomass parameter representative of the quantitative spatial distribution of biological agents in the field of view 11, on the basis of only those pixels of the holographic image that exhibit an active state defined by the image mask. The pixels in the inactive state are not taken into account for the determination of the value of the biomass parameter. Enough pixels in the active state must therefore be retained to enable the method to be implemented. Consequently, the image mask preferably associates an active state with at least 25% of the pixels of the holographic image, and preferably with at least 35% of the pixels of the holographic image. An activity threshold, corresponding to a number of pixels in the active state, or to a maximum number of pixels in the inactive state, may be set. If the image mask does not meet this activity threshold, for example because it has too few pixels in the active state, there are several possible solutions.

The fact that the threshold is not met may mean that the holographic image is essentially composed of artefacts, and therefore does not permit a reliable analysis of the biological sample. In this case, a non-conformance warning may be transmitted to the operator. The non-conformance warning for the biological sample may take a number of forms. For example, the analysis instrument may comprise an electroacoustic transducer, and the transmission of the non-conformance warning comprises the transmission of sounds to an operator to warn him of the non-conformance. Similarly, the transmission of the non-conformance warning may comprise the transmission of a light signal to the operator. The analysis instrument typically comprises a human-machine interface provided with a display screen, and the transmission of the non-conformance warning may comprise the display on the screen of a message warning an operator of the non-conformance of the biological sample. Such a warning, particularly when it occurs during an instant of measurement at the start of the measurement period, may make it possible to warn of a problem preventing the correct analysis of the biological sample, such as incorrect filling of the analysis receptacle 2, and may enable the operator to replace the biological sample without waiting for the end of the measurement period before detecting the problem, given that the measurement period may extend over several hours of incubation. The non-conformance warning may also take the form of a simple statement of the detection of the non-conformance, preferably with an indication of the instant of measurement, among the analysis results. This is because the air bubbles commonly grow during the measurement period, or incubation period, and it may be advantageous to know the moment when the growth of the bubbles made it impossible to obtain reliable measurements, in order to avoid taking any subsequent measurements into account, while enabling the previous measurements to be used. Other types of warning may be provided. If the activity threshold is not met by the image mask, this may also indicate that the masking threshold used is not suitable. The generation of an image mask with modified masking thresholds may therefore be considered.

Figure 7:
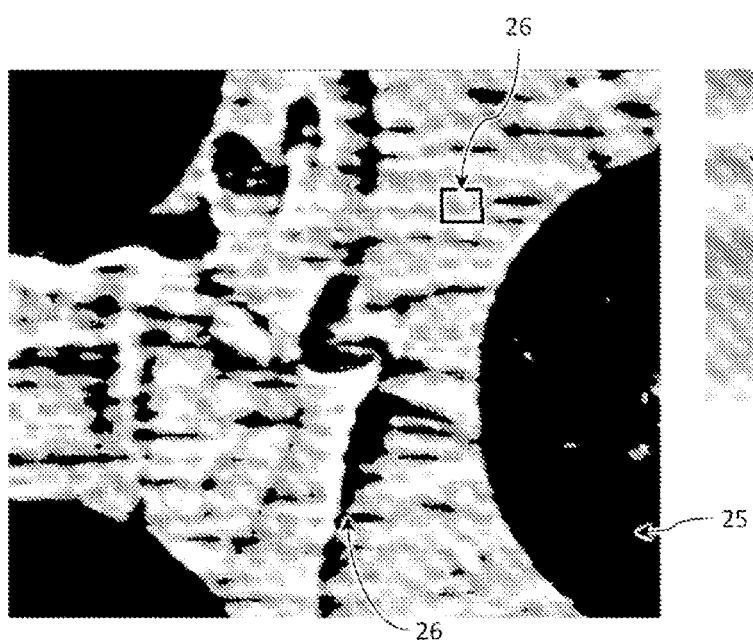
FIG. 7 shows the result of the application of the image mask of FIG. 6 to the holographic image of FIG. 4.
Figure 8:
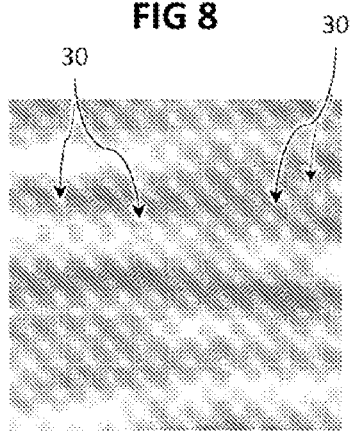

The biomass parameter may be of any type that enables the quantitative spatial distribution of biological agents in the field of view 11 to be taken into account. Notably, the value of the biomass parameter may be derived from a number of biological agents appearing in the active pixels of the holographic image. FIG. 7 shows an example of the result of the application of the image mask of FIG. 6 to the holographic image of FIG. 4. The rounded black shapes 25 corresponding to the air bubbles, without the white traces 24, and the black traces 26 can be seen here. These pixels are considered to be inactive and are not taken into account. A region 26 of active pixels is outlined, and enlargement of this region is shown in FIG. 8. This figure shows the presence of biological agents 30 in this region 26 of active pixels. The biological agents appear clearly and distinctly, in the form of small circles. It is therefore possible to detect the presence of these biological agents, and even to quantify them. The biomass parameter is, for example, a number of biological agents in the field of view, or, for example, a proportion of the extent of the holographic image occupied by biological agents. For example, the number of biological agents in the holographic image may be counted. If the holographic image is a hologram, the interference patterns typically appear in the form of rings around a biological agent. A ring is a shape that is particularly easy to identify with a shape recognition algorithm, and the holographic image can therefore be analyzed so as to list all the rings appearing there, corresponding to the same number of biological agents.

Instead of counting the number of biological agents, which may be a lengthy and resource-hungry procedure with an unreliable result, determining the value of the biomass parameter may comprise determining, for each of a plurality of areas of active pixels of the holographic image (typically several thousand areas), the presence or absence of biological agents in said area of active pixels. The biomass parameter may then correspond to the number or the proportion of areas of active pixels in which biological agents are present, or, more easily, may correspond to a number of areas where the biological agents are absent, which is easier to demonstrate. The size of the area is chosen to be small enough to enable biological agents to be isolated, but without necessarily curtailing the representation of these agents. For example, the area may be between 5 and 20 times larger than the typical size of the biological agents that are searched for. In one example, each area of active pixels extends over 20×20 pixels. However, other sizes may be chosen, for example in accordance with the size of the biological agents whose presence is to be detected, or alternatively in accordance with the desired degree of accuracy or the available data processing means and the speed of the data processing.

The presence or absence of a biological agent in an area of the holographic image may, for example, be determined by comparing the average gray level (or luminous intensity level) in an area with a gray level threshold. It is also possible to compare the pattern of the area with a database of reference patterns corresponding to a plurality of appearances of biological agents, and to identify the reference pattern having the greatest resemblance to the area pattern. The characteristics associated with this reference pattern are considered to be those of the area pattern, thus making it possible not only to detect the presence of biological agents in the area, but also to deduce additional characteristics, such as the individual growth of the biological agents, in accordance with the characteristics of the appearances recorded in the database.

The acquisition of a holographic image and the determination of a value of the biomass parameter, together with the determination of an image mask, make up a measurement cycle. The method therefore comprises a plurality of measurement cycles, consisting of steps (S02, S03, S04, S05) implemented in a repeated manner for a plurality of instants of measurement of a measurement period, for the purpose of obtaining analysis results. These measurement cycles are typically repeated over a period ranging from one minute to 30 minutes, depending on the speed of the analysis instrument, the number of biological samples processed in parallel, and, for example, the number of analysis receptacles 2 in an analysis card 1, and possibly depending on the speed of the interactions between the biological agents and the reagents. The measurement period extends over a number of hours, typically more than 10 hours, so that there are several tens or even several hundreds of instants of measurement. The method therefore typically comprises more than 10 cycles, and preferably more than 20 cycles of measurement during this measurement period. Each measurement cycle may therefore be used to obtain a value of a biomass parameter representative of the quantitative spatial distribution of biological agents in the field of view.

The method of analysis comprises a final step of supplying at least one value of the biomass parameter among the analysis results. Typically, the analysis results comprise the chronological organization of values of the biomass parameter, in order to allow the monitoring of the changes of the quantitative spatial distribution of biological agents in the field of view 11 over time. Preferably, the supply of the value of the biomass parameter takes the form of a graphic representation, such as a curve, an image or a table, allowing it to be communicated to an operator and to be interpreted by the latter. The graphic representation may, for example, be displayed on a display screen, having been put into a format allowing its display, or may be transmitted to a printer so that it can be printed.

The invention is not limited to the embodiment described and represented in the appended figures. Modifications may be made, notably in terms of the composition of the various characteristics techniques, or by substitution of technical equivalents, without thereby departing from the scope of protection of the invention.

The invention claimed is:

1. A method for analyzing a biological sample by means of an analysis instrument, the biological sample comprising biological agents and being arranged in an analysis receptacle in a field of view of a holographic imaging system, the method comprising:

acquiring a holographic image of the biological sample at an instant of measurement, the holographic image associating an intensity value with each pixel of the holographic image, the intensity values lying within a range of intensities extending between a minimum intensity value and a maximum intensity value, determining, from the holographic image acquired, an image mask which associates an active or inactive state with each pixel of the holographic image in accordance with the intensity values of the pixels of the holographic image, so that an inactive state is associated with pixels of the holographic image which correspond to artefacts caused by elements present in the field of view other than biological agents, the image mask being determined so that the inactive state is associated with at least some pixels of a connected set of pixels having intensity values within a masking range forming a subset of the intensity range, the masking range being delimited by at least one masking threshold, the determination of the image mask comprising a comparison of intensity values of the pixels of the holographic image with the at least one masking threshold and the association with each pixel of a first mask value indicating the inactive state of the pixel or a second mask value indicating the active state of the pixel in accordance with a result of the comparison, determining a value of at least one biomass parameter representative of a quantitative spatial distribution of biological agents in the field of view, on the basis of only those pixels of the holographic image that exhibit an active state defined by the image mask, supplying the value of the biomass parameter among the analysis results.

2. The method of analysis as claimed in claim 1, wherein the masking range is delimited by at least a lower masking threshold corresponding to a value of between 5% and 25% of the extent of the intensity range.

3. The method of analysis as claimed in claim 1, wherein the masking range is delimited by at least an upper masking threshold corresponding to a value of between 75% and 95% of the extent of the intensity range.

4. The method of analysis as claimed claim 1, wherein the determination of the image mask takes into account criteria of the size or shape of connected sets of pixels having intensity values in the masking range, for the purpose of assigning an active or inactive state to the pixels of the sets of pixels, and/or takes into account criteria of size or shape of connected sets of pixels having similar active or inactive states, for the purpose of modifying an active or inactive state for the pixels of the sets of pixels.

5. The method of analysis as claimed in claim 1, wherein the determination of the image mask comprises the implementation of mathematical morphology.

6. The method of analysis as claimed in claim 1, wherein the determination of the image mask comprises the use of a neural network preconfigured for associating an inactive state with pixels of the holographic image corresponding to artefacts caused by elements present in the field of view other than biological agents.

7. The method of analysis as claimed in claim 1, wherein the value of the biomass parameter is derived from a number of biological agents appearing in the active pixels of the holographic image.

8. The method of analysis as claimed in claim 1, wherein the determination of the value of the biomass parameter comprises the determination, for each of a plurality of areas of active pixels of the holographic image, of the presence or absence of biological agents in the area of active pixels.

9. The method of analysis as claimed in claim 8, wherein the presence or absence of biological agents in an area of active pixels is determined by comparing a gray level value of the area with a threshold, or by comparing a pattern of the area with reference patterns in a database.

10. The method of analysis as claimed in claim 1, wherein the image mask associates an active state with at least 25% of the pixels of the holographic image.

11. An analysis instrument comprising a holographic system, with a field of view configured for acquiring a holographic image, and data processing means, the analysis instrument being configured for receiving a biological sample in an analysis receptacle in the field of view of the holographic system and for implementing the steps of the method of analysis as claimed in claim 1.

* * * * *